Jan. 11, 1944.  H. STEINBACH  2,338,979

ELECTRIC MOTOR CONTROL

Filed July 25, 1940   2 Sheets-Sheet 1

INVENTOR.
Heinz Steinbach
BY
Cerstvik and Kalman
ATTORNEYS.

Jan. 11, 1944.  H. STEINBACH  2,338,979
ELECTRIC MOTOR CONTROL
Filed July 25, 1940  2 Sheets-Sheet 2

INVENTOR.
Heinz Steinbach
BY
Cerstvik and Kalman
ATTORNEYS.

Patented Jan. 11, 1944

2,338,979

UNITED STATES PATENT OFFICE 2,338,979

ELECTRIC MOTOR CONTROL

Heinz Steinbach, Berlin-Charlottenburg, Germany; vested in the Alien Property Custodian Application July 25, 1940, Serial No. 347,517
In Germany April 19, 1939

7 Claims. (Cl. 172—239)

This invention relates to electric motors, and more particularly to remote control means for electric motors.

One of the objects of the present invention is to provide novel means which are light in weight and especially adapted for use in aircraft for governing an electric motor at a point remote from the motor.

Another object of the invention is to provide novel means of the above character which are highly compact.

A further object is to provide easily accessible means for controlling electric motors which are mounted in inaccessible locations in vehicles such as aircraft.

The above and further objects and novel features will more fully appear from the following detailed description when the latter is ready in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views, Fig. 1 is a schematic illustration of one embodiment of the invention;

The forms of the invention illustrated in the accompanying drawings, by way of example, comprise remote control means for a motor which can be employed in a vehicle such as an aircraft. The remote control means are constituted by a plurality of switches which are arranged in a predetermined manner relative to a contact moving member which is operatively connected to said motor and which is adapted for tripping or governing each switch. Electrically connected to all of said switches is a primary or control contact arm which, for example, is manually operable and can engage each of a plurality of control stage contacts, each of the latter being electrically connected to a corresponding switch. The electric motor is adapted for being controlled in response to a current flowing in any circuit formed by the control contact arm, a stage, a switch and suitable means for interconnecting the switch and arm. The motor will be energized until the circuit is broken by the first mentioned contact moving member engaging a predetermined switch.

Figure 1:
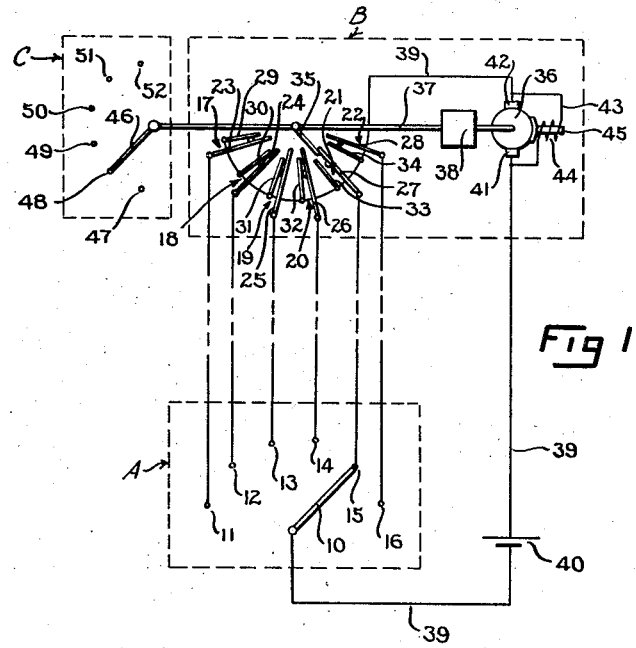

In the diagrammatic illustration of the invention shown in Fig. 1, a master or control transmitter A is operatively connected in a manner to appear later to a remotely controlled receiver apparatus B, which in turn is operatively connected to a device C which it is desired ultimately to control remotely. The control transmitter A is constituted by a control contact arm 10 which, for example, is manually operable and adapted for contacting any one of a plurality of contacts, such as contact elements or stages 11 to 16, inclusive. The contact stages are respectively connected electrically to suitable switch members 17 to 22, inclusive, upon the receiver apparatus B. Each of the switches 17 to 22 is constituted by a movable contact arm which is adapted to engage a stationary member and to remain in electrical contact with the stationary member until the movable arm is moved from a normal or initial position. As shown in Fig. 1, the movable elements of the switches 17 to 22 are constituted by elements 23 to 28. Members 23 to 28 respectively engage stationary arms 29 to 34, inclusive. The switches 17 to 22 are mounted in a predetermined relationship adjacent a repeater contact arm 35 which is operatively connected to electric motor 36 by means of a shaft 37. Preferably interposed in the operative interconnection between motor and arm 35 is a reduction gear 38. Each of the above mentioned switches is adapted for being controlled by the contact arm 35. The members 29 to 34, inclusive, of the switches are electrically connected by means of a common conductor 39 to the control contact arm 10 through a suitable source of electric energy 40.

In order that the electric motor 36 be controlled in response to a current flowing in any circuit formed by the control contact arm 10, a stage which it engages, a switch which is electrically connected to the stage and said conductor 39, it is preferable to interpose the electric motor in the conductor in such a manner that the energy from source 40 actuates the motor. The motor 36 in the embodiment shown is of the shunt variety and is provided with brushes 41 and 42 which are connected in the lead 39 in a conventional manner. Across the brushes 41 and 42 is a conductor 43 in which there is connected a solenoid 44 which governs in a well-known manner a brake member 45. The latter by suitable means (not shown) is adapted for frictionally engaging a portion of the motor to prevent rotation thereof when the motor is deenergized. Operatively connected to the shaft 37 is a contact arm 46 comprising a portion of the above mentioned member C which is adapted for engaging any one of a plurality of contacts 47 to 52, inclusive. The number of contacts upon the member C corresponds to the number of control stages of the control transmitter A.

In operation, in order to position the arm 46 in such a manner that it will engage, for example, the contact 48 so as to create or to release a predetermined control force, the contact arm 10 of the transmitter is placed upon the stage 15. Assuming that the switch 21 is closed at this time, a complete electric circuit will be formed between the energy source 40, the arm 10, the switch 21, and the portion of lead 39 between said switch and the motor, and the portion of lead 39 between the motor and the energy source. The motor 36 is thus energized and angularly shifts the repeater contact arm 35 to such a position that the movable element 27 of switch 21 is disengaged from member 33. Consequently, the circuit is broken and the motor 36 is deenergized. During the period that the latter was energized, the solenoid 44 lifted the brake member 45 out of engagement with a movable portion of the motor to allow a free rotation thereof. However, when the motor is deenergized, the brake member 45 immediately frictionally engages the rotor of the motor and arrests rotation of the shaft 37. When the repeater contact arm 35 has moved a sufficient amount to open the switch 21, the contact arm 46 will have moved to the desired position and will engage the contact 48 as shown in the figure.

Figure 2:
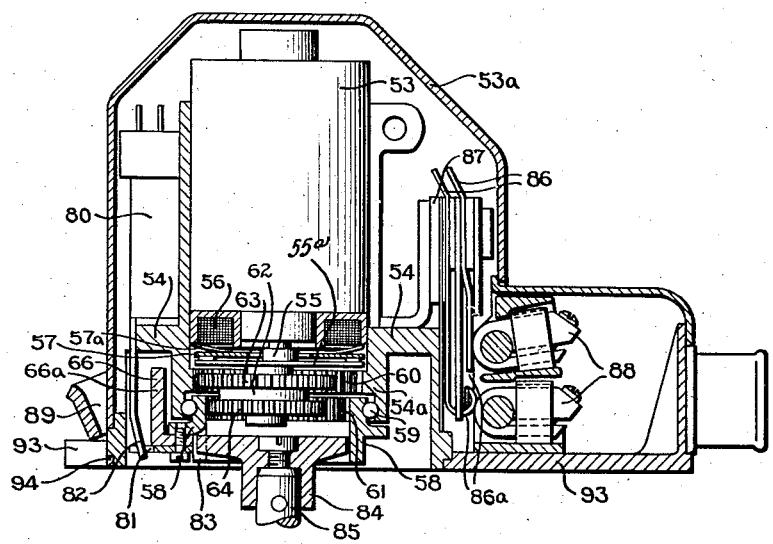
Fig. 2 is a side elevation partly in section of another embodiment of the invention.

In the form shown in Fig. 2, a motor 53 which is analogous to motor 36 is mounted upon a suitable support member 54 and is provided with a rotor shaft 55. The latter is surrounded by a solenoid coil 56 which controls an axially shiftable brake disc 57. Members 56 and 57 are respectively analogous to the solenoid 44 and the brake member 45. Disc 57 is urged by means of a spring 57a towards a disc 55a which is fixedly attached to shaft 55 and provided with a suitable counterbalance portion (not shown) in order to counteract the vibrations which would otherwise be produced by a crank member to be described later.

The support member 54 is provided with cylindrical portion 54a, preferably integral therewith, which is concentric with the shaft 55 and upon which is rotatably mounted a sleeve member 58. A portion of member 58 telescopically engages cylindrical portion 54a and is retained rotatably thereupon, for example, by suitable ball bearings 59, which are adapted for movement within a ball race upon the inner surface of member 54a, and also in a ball race upon an outer surface of member 58. Upon the latter are mounted repeater contact arms which are analogous to member 35 of Fig. 1, and which are adapted for engaging contact elements or switches in a manner to appear later.

The operative interconnection between the angularly shiftable member 58 and the motor shaft 55 is constituted by an epicyclic train having two sun gears 60 and 61, which are respectively constituted by inner toothed surfaces of a portion of the member 54a, and a portion of the member 58. A crank member 62 is attached to shaft 55 and adapted for rotation therewith substantially centrally of said toothed surfaces. Upon the crank member are mounted planetary gears 63 and 64 which are adapted for engaging respectively the toothed sun gears 60 and 61.

Figure 3:
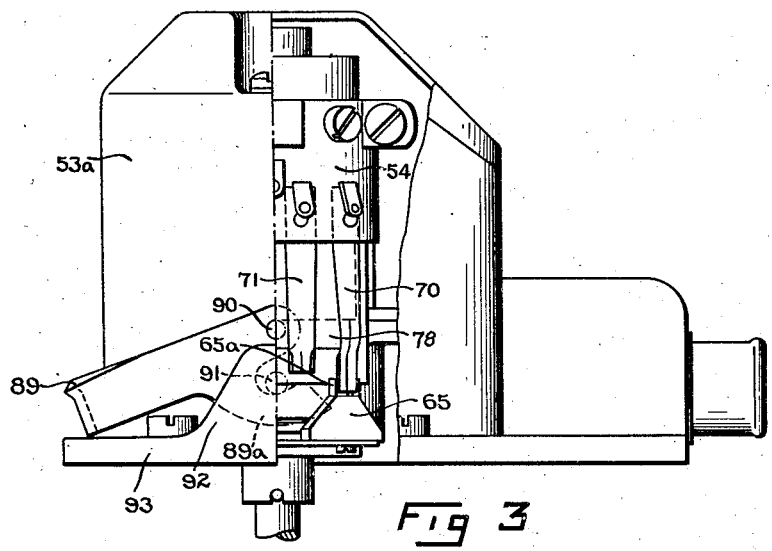
Fig. 3 is a side view with parts broken away of the embodiment of Fig. 2.
Figure 4:
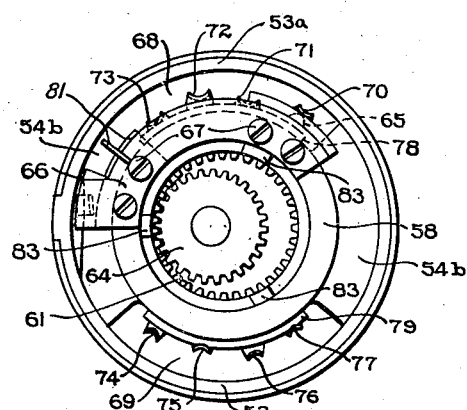
Fig. 4 is a bottom plan view of a portion of the embodiment of Fig. 2.

In the diagrammatically illustrated form of Fig. 1, the repeater contact arm 35 is able to open a particular switch only when moving in one direction, for example, in a counterclockwise direction. It is desirable, of course, that this arm and the switches be so adapted that the arm can govern the switches when moving both in a clockwise and counterclockwise direction. This is accomplished in the embodiment of Figs. 2 to 4 by employing repeater contact arms 65 and 66 which are provided with insulated cam surfaces 65a, 66a, respectively. The latter are adapted for engaging the extremities of switch elements and for moving same in such a manner that the particular switch is opened regardless of the direction from which the cam surface approached the switch. Two repeater contact arms instead of one as in Fig. 1 are used for a purpose to appear later. Each repeater contact arm, in the form shown in Figs. 2 to 4, is constituted by a member in the shape of an angle bar with one face thereof secured by suitable screws 67 to a flange upon the sleeve member 58 whereby the remaining face of the angle bar extends parallel to the axis of the motor 53 and to the axis of member 54a. Cam surfaces 65a, 66a are mounted upon the latter face of members 65 and 66. The angular position of each repeater contact arm can be adjusted, for example, by loosening screws 67 and shifting the arm to a desired position.

As illustrated in Fig. 4, the motor 53 is supported by two opposed arms 54b of the member 54. Each arm 54b occupies approximately 90° of the space about the motor, thereby leaving two opposed angular slots 68 and 69, each of about 90° in angular extent, formed between member 54 and an outer housing 53a. Consequently, the switch members which are employed in this embodiment must extend through said slots and are restricted to being distributed over 180° instead of over 360°. Eight switch members are employed with this embodiment. If 360° were available over which they could be distributed, the angular interval between adjacent switches would be 45° provided a uniform interval is desired. A single repeater contact arm would be effective to engage a switch after each 45° of motion. However, since 360° is not available and since it is desirable that repeater contact means open a switch at the termination of substantially uniform intervals of angular motion, a novel disposition of switch members and repeater contact arms must be resorted to. The eight switches are provided with fingers 70 to 77, respectively, each of which is adapted for engagement by a repeater contact arm.

The manner of mounting each switch finger is illustrated by the mounting of finger 70. The latter comprises an elongated member having a rounded face at the lower extremity thereof for engagement with a cam of a contact arm, and a pivot or hinge at the opposite extremity which enables it to shift angularly about an axis which is tangent to the member upon which the pivot is mounted, that is, upon member 54.

Fingers 70 to 73 are mounted at uniform intervals in slot 68 and normally engage a bead or segment 78 which comprises a common conductor member and is analogous to common conductor 39 (Fig. 1) between the switches 17 to 22 and the motor 36. Fingers 74 to 77 are mounted in slot 69 and normally engage a common conductor 79 which is connected by suitable means (not shown) to member 78.

If a single repeater contact arm were affixed to sleeve 58 and adapted for actuating the switches 70 to 77 one at a time, it is seen that the motor 53, the sleeve and hence any device operatively connected thereto would be controllable by a suitable control transmitter analogous to transmitter A, without uniform angular intervals occurring between all the openings of the switches. Consequently, in order that the switches be opened at uniform intervals, two contact arms are provided, one of which can engage one group of fingers and the other of which can engage another group. The factor which determines which finger engages which contact arms is the length of the finger and the arms. If there are two contact arms as here shown (Fig. 4), then one group of fingers will be of one length and the remaining group of a different length. Therefore, there is a repeater contact arm, such as 66 (Fig. 2) which is long and adapted for reaching and engaging the shorter fingers, and there is a short contact arm as 65 which engages only the longer fingers. Of course, means must be provided for preventing the longer of the two contact arms from tripping not only the short fingers but also the long ones. This is accomplished, in the form shown (Fig. 4), by disposing the lower extremity of the longer fingers at a slightly greater radial distance from the axis of rotation of the contact arms than the shorter fingers. The radial distance of the cam face of each contact arm is coordinated to that of the finger group it is to engage. Consequently, the longer contact arm 66 will be unable to reach radially the longer fingers.

In the embodiment shown, fingers 70, 72, 74 and 76 constitute the longer group and fingers 71, 73, 75 and 77 the shorter group. By mounting the repeater contact arm 65, for example, at approximately 110° or 115° from arm 66, a substantial uniformity of angular interval between all switch openings can be obtained. By changing the angular spacing between the two arms 65 and 66, this angular interval between the openings of the switches can be governed.

A tumbler or tilting switch 80 (Fig. 2) is mounted upon the housing of motor 53 and is adapted for reversing said motor, for example, in the event that the remotely controlled unit C is not able to be rotated through 360°. The reversing is accomplished preferably by means of a radially extending pin 81 which is mounted, for example, beneath the contact element 66 and adapted for angular movement therewith. Switch 80 is actuable by a suitable switch arm 82 which depends therefrom into the angular path of the pin 81.

The rotatable sleeve 58, as shown in Figs. 2 and 4, is provided at the lower edge thereof with a plurality of recesses 83. Into these recesses a suitable coupling member 84 fits and is thus adapted for rotation with member 58. Centrally disposed on the coupling member 84 is a shaft 85 which is operatively connected to an arm analogous to the above mentioned contact arm 46 of the remotely controlled unit C. In order that a predetermined angular relation between the member 58 and such a contact arm may be maintained, it is preferable that the recesses 83 be different one from the other such that the coupling 84 is adapted for engaging the member 58 when the two members are in only one angular relationship.

From a plurality of terminal arms 86 which are mounted upon a suitably insulated terminal bar 87, electrical conductors (not shown) lead to the various fingers of the repeater contact system and to the contact segments above described.

The operation of the embodiment is substantially analogous to the operation of the embodiment of Fig. 1, with the exception that the contact members 65 and 66 are adapted for lifting the contact fingers from the contact segments when the motor is in either clockwise or counter-clockwise rotation.

Arms 86 are provided with resilient lower extremities 86a which are engaged by corresponding terminal members 88. The latter press firmly against the arms in electric contact therewith. When changing or removing the motor and terminal bar, it is thus unnecessary to connect and disconnect each individual lead by the usual method of loosening screws and disentangling wires therefrom.

Suitable clamp means are provided for holding the outer housing 53a to the remainder of the device comprising a yoke 89 pivoted at 90 upon 53a. Fingers 89a of the yoke engage arms 91 which are fixed to shoulders 92, the latter being integral with a base plate 93 of the support member 54. In order to prevent angular shifting of housing 53a, a slot 94 in the lower edge thereof engages a projection of the base plate 93.

In operation, a transmitter contact arm (not shown), analogous to arm 10, which is connected to the embodiment of Figs. 2 to 4 is moved to a desired transmitter stage. The motor is thus energized, disc 57 is moved away from disc 55a against the force of spring 57a, thus releasing the motor and enabling the latter freely to rotate and to shift contact arms 65 and 66 angularly until the proper finger, for example, finger 70 (Fig. 3), is lifted away from the segment 74. Immediately the motor 53 is deenergized, the disc 57 is released, disc 55a is gripped thereby, and the motor is suddenly arrested in rotation.

There is thus provided novel means for remotely controlling an electric motor and a suitable device operatively connected to said motor. The novel device is compact, light in weight, and especially adapted for use aboard vehicles such as aircraft.

Although only two embodiments of the present invention have been illustrated and described in detail, it is to be expressly understood that the invention is not limited thereto. For example, a greater number of contact fingers or switch members can be employed together with a larger number of contact arms, such as 65 or 66. Various changes in the design and arrangement of the parts can be made without departing from the spirit and scope of the invention as the same will now be understood by those skilled in the art. For a definition of the limits of the invention, reference will be had primarily to the appended claims.

What is claimed is:

1. The combination with an electric motor of a control contact arm, a plurality of control contacts adapted for selective engagement by said control contact arm, a plurality of repeater switches each being electrically connected with a related control contact and with said motor, a reduction gear including a planetary gear train for said motor, a repeater contact arm operatively connected to said reduction gear for engaging and actuating said switches successively, an electro-magnetically controllable brake for said motor including a brake flange rotatable by said motor and coaxial with the reduction gear, said flange having a counterweight portion thereon for counter-balancing the planetary gear train, and means including a source of current for electrically connecting the control contact arm with the motor.

2. The combination with an electric motor of a source of current for energization thereof, a reduction gear operatively connected to the motor, a contact member operatively connected to said reduction gear, said member having two contact fingers adjustably mounted thereon, a set of contact elements, and another set of contact elements, both sets of said elements being electrically connected with one side of said motor, the elements of the first-named set being different in length from that of the second-named set, said elements having selective connections through said current source to the other side of said motor for controlling a flow of current from said source to energize said motor, each of said contact fingers being adapted for engaging one of said sets of elements when said motor is energized, whereby upon the engagement of a preselected one of said elements by its corresponding finger said motor is de-energized.

3. In apparatus of the class described, an electric motor, a source of current for energizing said motor, a contact bar coaxial with said motor and electrically connected thereto, a plurality of contact elements engaging said bar but movable therefrom, said elements being of a plurality of lengths, a reduction gear operatively connected to said motor, a contact arm operatively connected to said gear, said arm having fingers of differing sizes, each of said fingers being adapted for disengaging a contact element of a predetermined length from said bar, a plurality of control contacts, each of the latter being in electrical connection with a corresponding contact element, a control contact arm for selectively engaging any one of said control contacts, and means electrically interconnecting the control contact arm with said motor through said current source.

4. In apparatus of the class described, an electric motor, a source of current for energizing said motor, a contact bar coaxial with said motor and electrically connected thereto, a plurality of contact elements being of a plurality of lengths spaced about the longitudinal axis of said motor normally engaging said bar but being movable therefrom, an angularly movable contact arm mounted coaxial with said motor, a reduction gear operatively interconnecting said motor and said contact arm, said contact arm having fingers of differing sizes, each of said fingers being adapted for disengaging a contact element of a predetermined length from said bar, a plurality of control contacts electrically connected with said contact elements, a control contact arm for selectively engaging said control contacts, and means electrically interconnecting the control contact arm with said motor through said current source.

5. In apparatus of the class described, an electric motor, a source of current connected to one side of said motor for energization thereof, a contact bar coaxial with said motor and electrically connected to the other side of said motor, a plurality of contact elements being of a plurality of lengths arranged in a path concentric with the central axis of said motor normally engaging said bar but being movable therefrom, an angularly movable contact arm mounted coaxial with said motor, a reduction gear operatively interconnecting said motor and said contact arm, said contact arm having fingers of differing sizes arranged in a path concentric with the central axis of said motor, each of said fingers being adapted for disengaging a contact element of a predetermined length from said bar, a plurality of control contacts electrically connected with said contact elements, a control contact arm for selectively engaging said control contacts, and means electrically interconnecting the control contact arm with said motor through said current source.

6. The combination with an electric motor of a source of current for energization thereof, a reduction gear operatively connected to the motor, a contact member mounted coaxially with said motor and operatively connected to said reduction gear, said member having two contact fingers mounted thereon, a set of contact elements, and another set of contact elements, both sets of said elements being electrically connected with one side of said motor and having connecting means adapting said elements for selective connection through said source to the opposite side of said motor to energize said motor, the elements of the first-named set being different in length from that of the second-named set, each of said contact fingers being adapted for engaging one of said sets of elements when said motor is energized, whereby upon the engagement of a preselected one of said elements by its corresponding finger said motor is de-energized.

7. The combination with an electric motor of a source of current, a reduction gear operatively connected to the motor, a contact member mounted coaxially with said motor and operatively connected to said reduction gear, a plurality of parallel contact fingers mounted on said contact member, a set of contact elements, and another set of contact elements, both sets of said elements being electrically connected with one side of said motor and having connecting means adapting said elements for selective connection through said source to the opposite side of said motor to energize said motor, the elements of the first-named set being different in length from that of the second-named set, each of said contact fingers being adapted for engaging one of said sets of elements when said motor is energized, whereby upon the engagement of a preselected one of said elements by its corresponding finger said motor is de-energized.

HEINZ STEINBACH.